United States Patent [19]

Vaseen

[11] 4,311,918
[45] Jan. 19, 1982

[54] WIND POWERED GENERATOR WITH GRAVITY ASSISTED MECHANICAL ADVANTAGE BOOSETER

[76] Inventor: Vesper A. Vaseen, 9840 W. 35th Ave., Wheatridge, Colo. 80033

[21] Appl. No.: 176,134

[22] Filed: Aug. 7, 1980

[51] Int. Cl.³ .......................... F01D 7/00; F03D 7/04
[52] U.S. Cl. ...................................... 290/55; 416/19; 416/119
[58] Field of Search .................... 416/117, 119, 19; 290/55, 44; 60/721

[56] References Cited

FOREIGN PATENT DOCUMENTS

| | | | |
|---|---|---|---|
| 963229 | 5/1957 | Fed. Rep. of Germany | 416/19 |
| 1503324 | 8/1969 | Fed. Rep. of Germany | 416/119 |
| 2303180 | 10/1976 | France | 60/721 |
| 2361552 | 4/1978 | France | 60/721 |
| 2372357 | 7/1978 | France | 74/DIG. 9 |
| 2378192 | 9/1978 | France | 74/DIG. 9 |

Primary Examiner—J. V. Truhe
Assistant Examiner—Shelley Wade

[57] ABSTRACT

The wind powered mechanical and electric power generator, is a process and apparatus which uses the mechanical advantage of a lever arm to multiply the energy of a moving or mobile weight which is wind powered from a propeller drive, and converts by gravity and mechanical advantage said energy to useful work. The unit consists in its simplest form of a counter balanced wheel on one side of a centerline shaft and a concentrated weight on the opposite side, both kept rigid by a connecting structure beam, the entire unit made to revolve around the centerline shaft by moving a mobil weight around the wheel perimeter in concert with the units rotation so as to continually produce an off-balance of weights, which then uses gravity to cause the total unit to rotate. The mobile weight is driven around the wheel by a wind powered small propeller.

11 Claims, 3 Drawing Figures

WIND POWERED GENERATOR WITH GRAVITY ASSISTED MECHANICAL ADVANTAGE BOOSETER

HISTORICAL AND DESCRIPTION OF PRIOR ART

A "windmill" is a wind powered machine that is used to do useful work. The original windmill is believed to be persian in origin, characterized by sails rigged on spokes radiating from a vertical axis.

Windmills appeared in Europe during the 11th century with the rotor axis inclined at an angle of 30° to the horizontal. By the 17th century, windmills were in widespread use throughout Europe.

The first windmills in the United States were built by the Dutch on Manhatten Island in the early 17th century. The fixed portion of the mill housing took the form of an octagonal tower in which the chief bearing members were eight inward leaning posts. The gable roofed cap of the mill was a separate structure supported by a ring beam known as the curb. The cap was free to rotate with wind direction. Four sails on light rectangular frames from rigid arms swept an area of 60 feet (±) in diameter and rotated a tilted drive shaft, which in turn transmitted mechanical power for useful work.

A variety of blades or propellers have been introduced to attempt to achieve the maximum of theoretical energy from a given area of wind interuption at a given wind velocity. These are the "savonious", or vertical figure "s" rotor; American multiblade, typical of the familiar "farm pump mill"; the Dutch four arm, rectangular frame blades on rigid support arms rotor; high speed, two blade, or airplane propeller type; Darrieus Rotors, vertical blades around a vertical rotor; and the vortex tower, with wind directed from horizontal to vertical by adeflector through a vertical squirrel cage rotor. No prior art has been disclosed that uses "mechanical advantage" of gravity and wind power combined to produce useful work.

SUMMARY OF THE INVENTION

The wind generator rotating units are mounted on a foundation, preferably a rigid frame 1, and rotate around a main shaft and bearing 2. FIG. 1, FIG. 2 and FIG. 3 are illustrative of two counter balanced weights, $W_1$ representing preferably a solid mass or weight and $W_2$ a wheel or circular structure mass or weight within which a weighted unit or mass, $W_3$ is caused to rotate around its circumference. The solid weight $W_1$ and the wheel $W_2$ are counter balanced so that the product of their distances, ($W_1 \times D_1$) weight-one times distance-one, is preferably equal to ($W_2 \times D_2$) weight-two times distance-two. Thus, when the unit or structural connection beam 3 is at rest, the force of gravity acts equally on both the right and left side of the main shaft and bearing 2. The main shaft 2 is connected to an alternator or generator for production of electric energy or mechanical drives for product of mechanical energy.

To produce useful electrical or mechanical energy, the weights $W_1$ and $W_2$ with their rigid connective member (3) are caused to revolve by use of wind energy which first produces a revolving action in one or more propeller blades 4 which in turn produce a rotary action of weight $W_3$, and by mechanical, pheumatic, or hydraulic means moves the weight $W_3$ within or without the circumference of the wheel to produce an imbalance of forces around the shaft 2. When the product of $W_1 \times D_1$ is less than $W_2 \times D_2 + W_3 \times D_3$ as illustrated with FIG. 1 and FIG. 2, the structural beam 3 will revolve clockwise around the shaft 2 and produce useful work in said shaft. The weight $W_3$ is always moved in concert by the wind energy which is converted to mechanical energy via the propeller on the right side of FIGS. 1, 2 and 3 so as to maintain its locaton outside or to the right of the centerline of the wheel $W_2$, thus producing a greater downward pull of gravity on the right side of the shaft and thus producing rotary action. In like manner, the weight $W_3$ is similarly moved by wind energy converted to mechanical energy via the propeller on the left side of FIGS. 1, 2 and 3 so as to maintain its location inside, or to the right of the centerline of the wheel $W_2$, thus transferring the greater gravity pull to $W_1$ on the right side of the shaft and thus continuing the production of rotary action. This is illustrated by the formula $W_1 \times D_1$ is greater than $W_2 \times D_2 + W_3 \times D_4$. The circumferential velocity of the mechanical device being used to move weight $W_3$ around the circumference of the wheel $W_2$ is designed to move around the wheel $W_2$ one full perimeter or circumference distance with each 360° revolution of weights $W_1$ and $W_2$ around the shaft 2.

The illustration heretofore is for a single pair of weights $W_1$ and $W_2$, their counter balance being control imbalanced by $W_3$; but which in practice can be multiple units or pairs; so established around one or more shafts 2.

FIG. 1 illustrates the relative locations of $W_1$, $W_2$ with respect to an arbitrary starting position of $W_2$ on the right side of shaft 2 and at horizontal or 90° to vertical; then in 45° increments through a full 360° revolution. Weights $W_1$ and $W_2$ revolve around a common centerline shaft 2; whereas $W_3$ revolves about a point in space center line 5 to the right of the shaft.

DESCRIPTION OF DRAWINGS

The drawing

FIG. 1—Illustrates a full 360° revolution of two counter balanced masses or weights $W_1$ $W_2$ rigidly mounted on a connective beam 3 which is caused to revolve around a support shaft and bearing 2 by means of a controlled imbalance produced by moving a weight $W_3$ to specific locations during the 360° revolution. Weight $W_3$ being moved to and located in said specific locations by a spur gear, worm gear, or other gear arrangement; or pneumatic or hydraulic drive also a part of the wheel $W_2$.

FIG. 2—Illustrates the position of $W_2 \times D_2 + W_3 \times D_3$ being of greater moment than $W_1 \times D_1$ thus producing rotation clockwise.

FIG. 3—Illustrates the position of $W_1 \times D_1$ being of greater moment than $W_2 \times D_2 + W_3 \times D_4$ thus producing rotation clockwise.

PREFERRED EMBODIMENT

Figure 1:
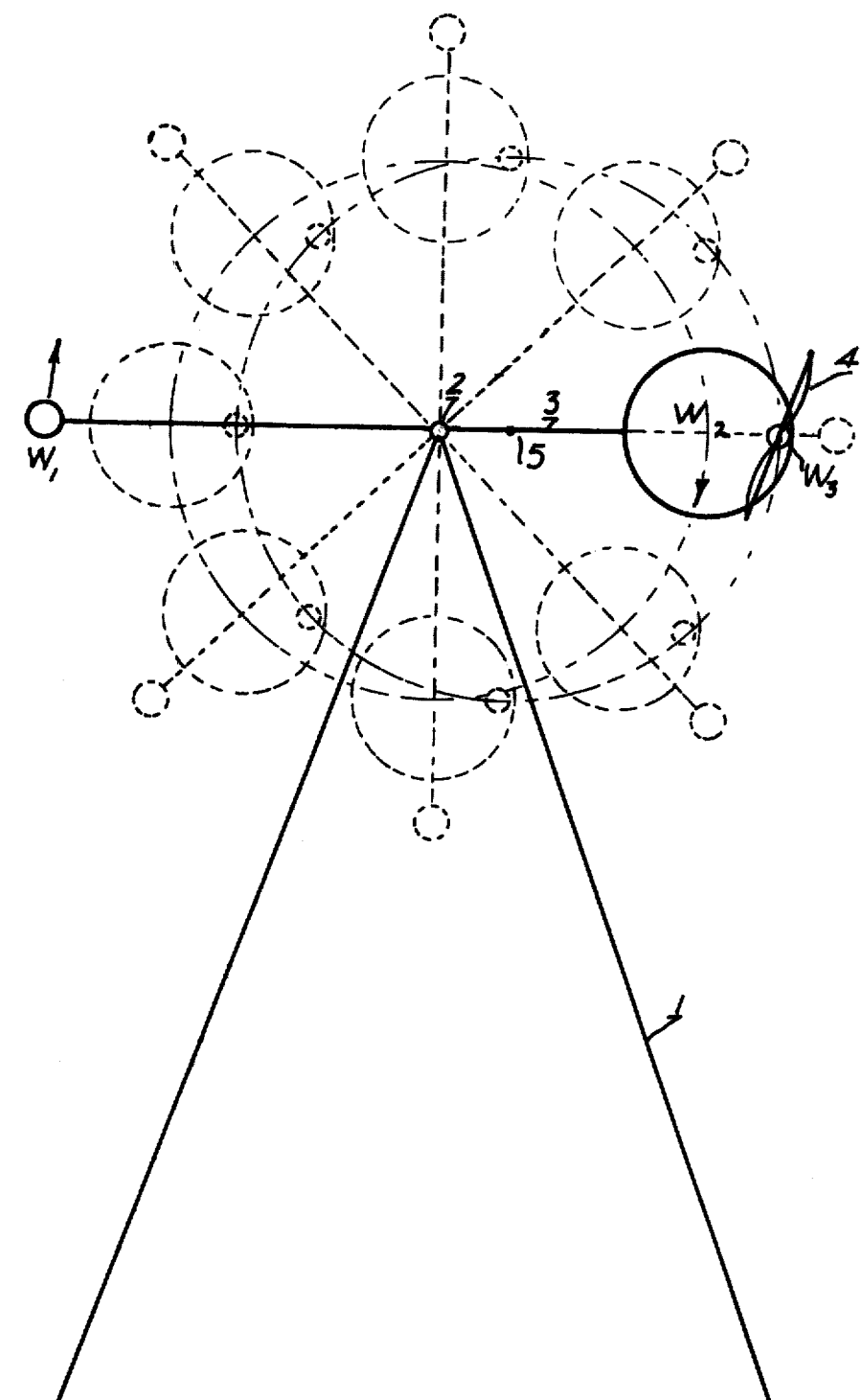
FIGS. 1, 2 and 3 are illustrative of the physical laws which make the disclosure of use of gravity and mechanical advantage applicable to conversion of wind energy to useful mechanical energy.
Figure 2:
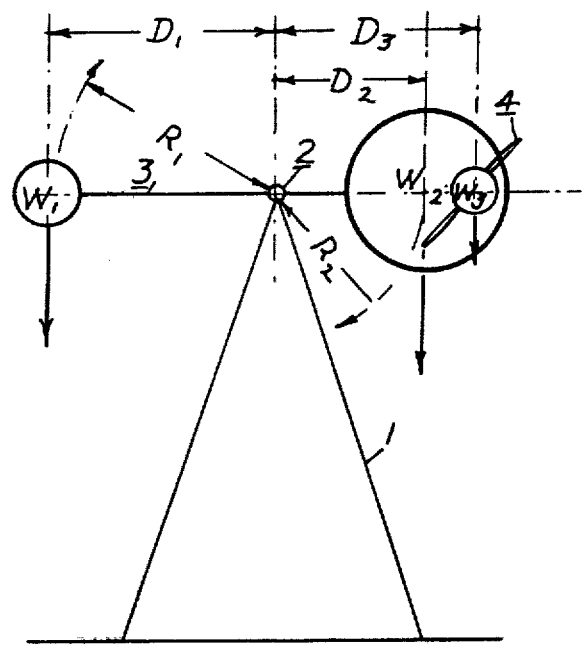
Figure 3:
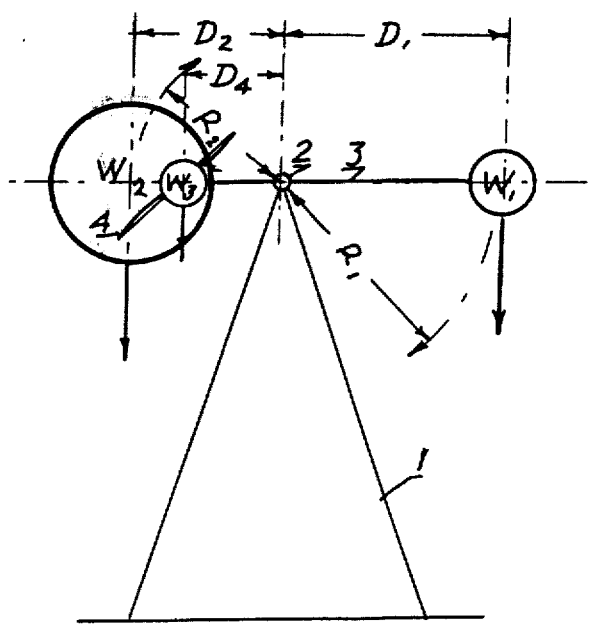

The explanation and description of the invention is best illustrated by way of example. The following example is descriptive of the single or simplest configuration of rotating units, whereas greater power or energy is achieved by use of multiple units.

The example hereafter is illustrative of a single counter-balance pair of masses or weights $W_1$ and $W_2$. Since these are counter-balanced weights representing the structural members and connection beam 3; and although are applicable masses or weights which must be taken into consideration when designing the strength of support structures, and kinetic energy ($MV^2$) factors, are common to structural designs of similar rotating members and well known to those who are experienced in the design of such structures and are therefore not detailed herein.

For example, 20,000 W are desired from a single pair of masses $W_1$ and $W_2$ revolving around the power take off shaft 2.

Maximum design velocity of the outer most revolving part is preferably (26) twenty-six miles per hour (2288 feet per minute). In this example the exterior perimeter of $W_2$ is selected outside the diameter of $W_1$ and thus is chosen at a design velocity of 26 mph. An alternate design is just as permissible for $W_1$ to have a larger diameter of rotation than $W_2$ and thus being the controlling (blade tip) velocity/mass factor.

A KW of electrical energy is equivalent to $4.425 \times 10^4$ foot pounds per minute; therefore it is necessary to produce $88.5 \times 10^4$ foot pounds per minute of energy from the unit. Losses due to mechanical efficiency are not taken into account in this example, but in actual field design for practical use must be taken into consideration.

The design selected herewith by way of example selected a $D_1$ and $D_2$ of 7.5 feet with a wheel or $W_2$ diameter of 10.0 feet.

The mass required to produce $88.5 \times 10^4$ foot pounds of energy with a 26 mph (2288 feet per minute) calculates to be 387.63 pounds. The shifting of mass from $W_3$ at top and full vertical and the entire unit in balance to $W_3$ at 90° and at maximum moment or reaction ($W_3 \times D_3$); thence return to $W_3$ at bottom, and full vertical thus requires the equivalent mass or weight be increased to 581.45 pounds. The $MV^2$ kinetic energy of the mass $W_3$ and its velocity thus carries the mass or weight of $W_3$ in a continual rotation around its point in space centerline 5; in concert with $W_1$ and $W_2$. The supplemental energy required to continue the rotation of the entire unit $W_1$, $W_2$ and $W_3$ around the power takeoff shaft 2 is the energy lost to friction (including wind resistance to rotation), which is supplied by preferably a 12 foot diameter blade tip to blade tip, three blade propeller producing 800 to 9500 W depending on wind speed with 2000 W, as per example herewith, designated to overcome friction when the wind velocity is a rated wind velocity of 21 mph and a cutoff with a wind velocity of 7 mph. The perimeter or circumference velocity of the wheel for this example at 25 foot diameter of unit with a periferal velocity at design of 2280 feet per minute thus reduces to a shaft 2 revolution of 4.6448 rpm. A mechanical speed increaser, increases the alternator or generator shaft speed to that selected as appropriate to the power take of desired.

Preferably a jockey or alternative power source is used to move the mass $W_3$ to the vertical position on the right side of the shaft for starting rotation and a speed control device such as a governor is instlled between the propeller drive and $W_3$ or on the propeller proper.

Thus has been disclosed and taught how mechanical advantage can be taken advantage of when converting wind energy to electrical or mechanical power for useful work.

The example along with mechanical factors used herein are by way of illustration and not restrictive to the use of the art and science taught by this disclosure.

The unit is kept perpendicular to the wind by either automatic mechanical device or motor driven, device as are common to the market of wind generation devices.

Those familiar with wind power devices will have no difficulty selecting such a device to satisfy the particular design and locations of the unit.

the height of the centerline shaft 2 is preferably located to take advantage of the maximum average wind power availability for site selected. Those familiar with wind power generation will have no difficulty in selecting the optimum height for design of unit selected.

The rotating device selected for conversion of the wind power to mechanical energy and rotation of weight $W_3$ can be a "savonious", American multi blade, Dutch four arm, high speed two or more blade, Darrieus, or Vortex Tower; or any other mechanical device which first uses wind power to create rotary motion in a shaft, which is then used to move weight $W_3$ to its respective locations in the wheel.

While the invention has been described in a certain degree of particularity, it is understood that the disclosure has been by way of example and that details so explained may be made without departing from the spirit thereof. For example the mobile weight is moved back and forth from right to left along a horizontal line maintained through the centerline of the wheel thus achieving the same imbalance control of the weight distribution as moving it along the perimeter of the wheel.

I claim:

1. What is claimed is the method of converting wind energy to mechanical energy by the use of the mechanical advantage of the wind energy providing a continuously off-balance condition wherein gravity is put to work assisting the wind energy in the production of energy for useful work such as mechanical rotary motion or generation of electrical energy by the;
   use of a counter balanced pair or multiple pairs of weights,
   one of which is a concentrated mass,
   one of which is a circle or wheel configuration mass,
   then providing for an imbalance between the concentrated mass, and the wheel or circle mass,
   by the controlled location of an auxiliary mass within the wheel,
   such as to first add increased force on the downward motion of the wheel side of the counter balanced unit.
   then reduce the force on the upward motion of the wheel side of the counter balanced unit,
   causing the force on the concentrated mass to exceed that on the wheel and auxiliary mass and thus take on a downward rotation,
   the auxiliary mass moving along the wheel in predesigned locations,
   such as to continuously produce a greater force on the downward motion side of the rotating unit,
   the auxiliary mass moving along the wheel by the conversion of wind energy to rotary motion by means of a propeller, savonious rotor, American mult blade rotor, Dutch four arm rotor, high speed two or more blade propeller, Darrious rotor, Vortex tower rotor, or any other similar device,
   and located at specific balance points or locations within or without the wheel by means of gears, chains, belts, pneumatic, or hydraulic device or combination of devices, thus using the mechanical advantage of mass times its distance or lever arm, with the mass acted on by gravity, to convert wind energy to useful work.

2. The method of claim 1 wherein the rotation of the concentrated mass and wheel mass is centered about a centerline shaft and bearing, but the center of rotation of the auxiliary mass within the wheel is a "point in space" located to the right of the shaft for clockwise rotation units, and left of shaft for counter clockwise rotation units.

3. The method of claim 1 where the ratio of the diameter of the outermost rotating mass to the distance the "point in space" centerline of the auxiliary mass is right or left of the shaft is a measure of the mechanical advantage of the mechanical energy to wind energy.

4. The method of claim 1 with the production of mechanical energy via a rotating shaft for useful work.

5. The method of claim 1 with the use of a generator for direct current electric power.

6. The method of claim 1 with the use of an alternator for alternating current electric power.

7. The method of claim 1 with clockwise rotation as the direction of rotation.

8. The method of claim 1 with counter clockwise rotation as the direction of rotation.

9. The method of claim 1 wherein the concentrated mass has a larger diameter of travel than does the wheel mass.

10. The method of claim 1 wherein the concentrated mass has a lessor diameter of travel than does the wheel mass.

11. The method of claim 1 wherein the mobil mass is alternately moved in concert with the revolution of the total unit to the right and then to the left of the centerline of the wheel configuration in a horizontal direction rather than in a circular motion at the wheel perimeter.

* * * * *